United States Patent
Toyama et al.

(10) Patent No.: US 7,496,415 B2
(45) Date of Patent: Feb. 24, 2009

(54) DIGITAL SERVO CONTROL UNIT AND LASER MACHINING APPARATUS

(75) Inventors: Souichi Toyama, Ebina (JP); Yaichi Okubo, Ebina (JP)

(73) Assignee: Hitachi Via Mechanics, Ltd., Ebina-shi (JP)

( * ) Notice: Subject to any disclaimer, the term of this patent is extended or adjusted under 35 U.S.C. 154(b) by 267 days.

(21) Appl. No.: 11/442,155

(22) Filed: May 30, 2006

(65) Prior Publication Data

US 2006/0271232 A1 Nov. 30, 2006

(30) Foreign Application Priority Data

May 31, 2005 (JP) .............................. 2005-159919

(51) Int. Cl.
*G06F 19/00* (2006.01)
(52) U.S. Cl. ........................................ 700/56; 700/166
(58) Field of Classification Search .................... 700/56, 700/116, 166; 219/121.63, 121.75; 318/772, 318/560; 360/31
See application file for complete search history.

(56) References Cited

U.S. PATENT DOCUMENTS

| | | | | |
|---|---|---|---|---|
| 5,325,247 A | * | 6/1994 | Ehrlich et al. | 360/78.09 |
| 5,479,388 A | * | 12/1995 | Gondou et al. | 369/47.25 |
| 5,623,402 A | * | 4/1997 | Johnson | 700/42 |
| 6,013,995 A | * | 1/2000 | Kim | 318/561 |
| 6,243,226 B1 | * | 6/2001 | Jeong | 360/78.07 |
| 6,631,004 B1 | * | 10/2003 | Hill et al. | 356/487 |
| 6,785,080 B1 | * | 8/2004 | Sun et al. | 360/75 |
| 2004/0246325 A1 | * | 12/2004 | Sekiya | 347/104 |
| 2007/0121439 A1 | * | 5/2007 | Dekker | 369/44.28 |

FOREIGN PATENT DOCUMENTS

JP    2001-268968 A    9/2001

* cited by examiner

*Primary Examiner*—Kidest Bahta
(74) *Attorney, Agent, or Firm*—Crowell & Moring LLP

(57) ABSTRACT

A digital servo control unit which uses a D/A converter, which suppresses the spike-like pulsation superimposed on a current error signal inside a current control circuit, and which has control performance not lower than that in the background art even when a low-voltage and low-price power supply circuit is used. A first-order low pass filter acts on an analog signal output by the D/A converter, and a stabilizing compensation occurs for a phase delay caused by the first-order low pass filter. The first-order low pass filter is formed as a low pass filter having a cut-off frequency which is lower than a sampling frequency. The first-order low pass filter may be replaced by a notch filter having a cut-off frequency which is equal to a sampling frequency or which is equal to an integer multiple of a Nyquist frequency.

6 Claims, 10 Drawing Sheets

DIGITAL SERVO CONTROL UNIT AND LASER MACHINING APPARATUS

FIELD OF THE INVENTION

The present invention relates to a digital servo control unit including a processor for performing a servo control process for every predetermined sampling period, a D/A converter for converting a control input signal calculated by the servo control process, into an analog signal, and a current control circuit for controlling a driving current to be supplied to an actuator in accordance with the D/A-converted control input signal; and a laser machining apparatus for machining while controlling the position of a steerable mirror by means of such a digital servo control unit.

DESCRIPTION OF THE BACKGROUND ART

In recent years, mechatronics technologies have been developed conspicuously. For example, sophisticated servo control techniques have been applied to industrial machinery or information equipment so as to realize fast and precise mechanism control, that is, motion control. Particularly digital servo control based on arithmetic processing with processors has a great part to play therein. The digital servo control can achieve a fine control to change control parameters in accordance with the status of a controlled object or the operation pattern of a control system by way of example. Thus, the digital servo control can easily enhance the control performance as compared with analog servo control with a control circuit constituted by an operational amplifier and so on.

A digital servo control unit is typically configured as follows. First, a state value such as position, velocity, etc. of a mechanism as a controlled object is detected by a sensor. In this event, when the sensor is a sensor outputting a digital signal, such as an encoder, the output signal is used as it is. When the sensor outputs an analog signal, the analog signal is converted into a digital signal by an A/D converter or the like, and the digital signal is used. This digital state value signal is imported into a processor for every constant sampling period, and arithmetically processed by a servo control program so as to generate a control input signal. The control input signal is input to an actuator so as to control the controlled object.

The servo control program chiefly performs an arithmetic process for feedback control. For example, when the control system is aimed at positioning control, a position detection signal from a position sensor is subtracted from a target position signal like a step function, so as to calculate a position error signal. The positioning control is intended to make the controlled object stand still in a target position with no error. It is therefore necessary to bring the position error signal into zero when the controlled object stands still. To this end, compensation to integrate the position error signal as in PID control is used in a servo compensator.

The control input signal generated by such a servo control program is converted into an analog signal by a D/A converter. This analog signal is input as a current command signal to a current control circuit for supplying a driving current to the actuator. In this event, due to the zero-order hold operation of the D/A converter, the current command signal has a stepwise waveform whose value is updated for every sampling period.

In the current control circuit, the driving current is detected by a shunt resistor or a "Hall" device. A current detection signal obtained thus is subtracted from the current command signal by an operational amplifier circuit so as to output a current error signal. A power transistor is resistor-controlled or PWM-controlled by the current error signal so as to control the driving current. Thus, driving torque is electromagnetically generated in the actuator so that the mechanism as the controlled object is operated.

The current command signal has a stepwise waveform for every sampling period, while the change of the driving current is usually smooth. Therefore, the current detection signal also has a smooth waveform. As a result, spike-like pulsation synchronizing with the sampling period is superimposed on the current error signal obtained by subtracting the current detection signal from the current command signal. When the pulsation has a high peak value, a power supply voltage to the power transistor may be saturated or the pulse width modulation of the PMW control may be abnormal. Thus, the driving current cannot be controlled to follow the current command signal accurately. If the power supply voltage to the power transistor is increased, this pulsation can be allowed. However, increase of the power supply voltage leads to increase in cost.

As one of methods for lowering the peak value of the pulsation, the sampling period may be shortened. When the period with which the zero-order hold operation of the D/A converter updates the output signal is shortened, the difference between the steps of the current command signal becomes so small that the pulsation of the current error signal is reduced.

According to another method for suppressing the pulsation, the current command signal may be generated by a first-order hold operation. To this end, there is a technique in which a linear interpolation means constituted by a means for predictively calculating a current command value at the next sampling time, and a linear function generating means for linearly connecting the predicted current command value and a current command value at the present sampling time is provided to linearly interpolate the current command signal between the sampling times so as to suppress occurrence of torque ripples in an AC servo motor (JP-A-2001-268968).

However, it is difficult to shorten the sampling period due to the arithmetically processing time of the servo control program. It is therefore necessary to provide a means for performing multi-rate control to interpolate the control input signal at a temporal interval smaller than the sampling period. In addition, even if the sampling period is shortened or the control input signal is interpolated, it will be difficult to suppress the pulsation perfectly when the current command signal changes stepwise.

Further, in the technique disclosed in JP-A-2001-268968, it is necessary to predictively calculate the current command value at the next sampling time or to provide a means for generating a linear function between the present sampling time and the next sampling time. Thus, there is a fear that the control program may be complicated or the cost of the control unit may increase.

SUMMARY OF THE INVENTION

In order to solve the foregoing problems, an object of the invention is to provide a digital servo control unit which uses a D/A converter, which suppresses the spike-like pulsation superimposed on a current error signal inside a current control circuit, and which has control performance not lower than that in the background art even when a low-voltage and low-price power supply circuit is used. Another object of the invention is to provide a laser machining apparatus for irradiating a predetermined position of a to-be-machined product with a laser beam through a steerable mirror so as to perform machining such as perforating, wherein the angle of the steerable mirror is position-controlled by the aforementioned digital servo control unit so that the cost of parts can be reduced while the machining throughput of the laser machining apparatus and the performance as to the machining position accuracy are kept.

In order to solve the foregoing problems, a first means of the present invention is a digital servo control unit including: a processor for performing a servo control process for every predetermined sampling period; a D/A converter for converting a control input signal into an analog signal, the control input signal being calculated by the servo control process; a current control circuit for controlling a driving current to be supplied to an actuator in accordance with the D/A-converted control input signal; a filter acting on the analog signal output by the D/A converter; and a stabilizing compensation means for compensating a phase delay caused by the filter; wherein an output signal of the filter is input to the current control circuit as a current command signal.

In this case, the filter may be formed as a low pass filter having a cut-off frequency which is lower than a sampling frequency, a notch filter having a cut-off frequency which is equal to a sampling frequency, or a notch filter having a cut-off frequency which is equal to an integral multiple of a Nyquist frequency.

The stabilizing compensation means may be implemented as a part of a servo control process program to be executed by the processor.

In this case, the part of the servo control process program may be set as a program for estimating a state variable value of the filter and multiplying the estimated value by a coefficient so as to perform state feedback.

A second means of the present invention is a laser machining apparatus including: a digital servo control unit which is the aforementioned first means of the present invention; an actuator to be driven by the digital servo control unit; and a steerable mirror to be positioned by the actuator; wherein an angle of a laser beam reflected by the steerable mirror is controlled to machine a predetermined position of a to-be-machined product.

According to the present invention, an analog signal output from the D/A converter is smoothed by the low pass filter or the notch filter so as to be a current command signal. Thus, the current command signal does not have a stepwise waveform synchronizing with a sampling period but has a smooth waveform. Accordingly, a driving current can be controlled to follow the current command signal accurately without occurrence of spike-like pulsation in a current error signal of the current control circuit. The stability margin of servo control can be kept by the stabilizing compensation means for compensating a phase delay caused by the filter. Further, in view of cost, a low-price power supply can be used because the power supply to a power transistor can be made to have a low voltage. The filter can be constituted by a simple operational amplifier circuit, and the stabilizing compensation means can be implemented by a program of the processor. Thus, the cost of parts of the apparatus can be suppressed.

DETAILED DESCRIPTION OF THE INVENTION

The present invention will be described on a servo control unit for positioning the angle of a steerable mirror by means of a rotary electromagnetic actuator by way of example.

FIRST EMBODIMENT

Figure 1:
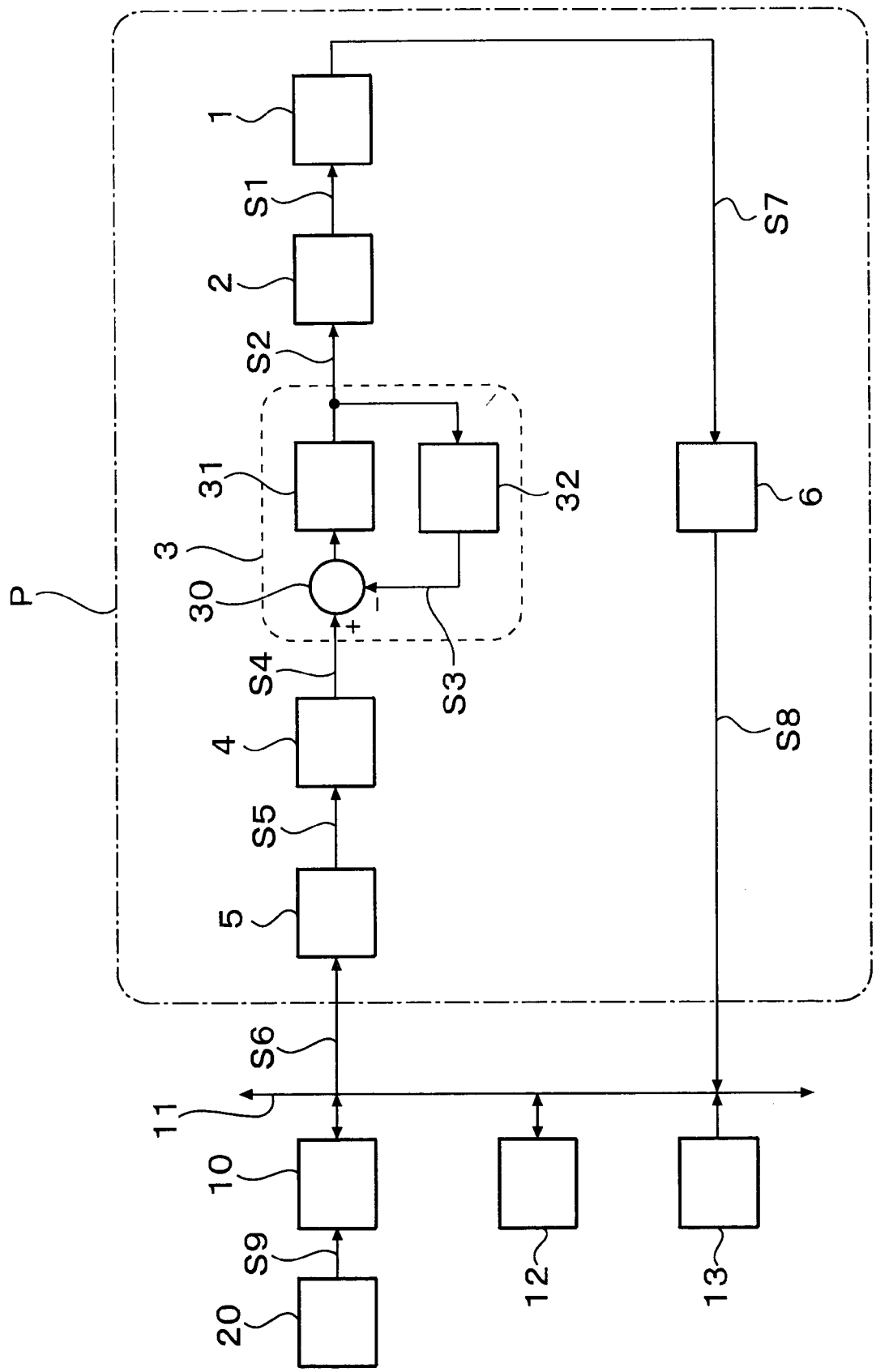
FIG. 1 is a block diagram of a digital servo control unit according to the present invention.

FIG. 1 is a block diagram of a digital servo control unit according to the present invention.

This control unit is a unit for digitally controlling the operation of a positioning mechanism 1 by a processor 10. The positioning mechanism 1 is driven by an actuator 2. When the present invention is applied to a digital servo control unit for a steerable mirror, the actuator 2 is a rotary electromagnetic actuator. The steerable mirror is fastened to the rotating shaft of the positioning mechanism 1. The positioning mechanism 1 is a rotor mechanism rotating in accordance with the driving torque generated by the actuator 2.

The processor 10 is connected to a D/A converter 5, an encoder 6, a random access memory (RAM) 12 and a read only memory (ROM) 13 through a bus 11.

A host controller 20 transmits an target position signal S9 of positioning operation to the processor 10. The encoder 6 detects a displacement S7 of the positioning mechanism 1 and outputs a discrete-time position detection signal (herein, an angle displacement of the rotating shaft, that is, the steerable mirror) S8 by sampling period.

The processor 10 executes a servo control program to make the position detection signal S8 follow the target position signal S9 with no steady-state error. A control input signal S6 is calculated for every sampling period by this program. The control input signal S6 is converted into an analog voltage signal S5 by the D/A converter 5. The analog voltage signal S5 has a stepwise time waveform in which the voltage value is updated for every sampling period. Since the cut-off frequency of a first-order low pass filter 4 is set to be lower than the sampling frequency, a current command signal S4 output by the first-order low pass filter 4 has a smooth time waveform.

A current control circuit 3 controls a driving current S2 to follow the current command signal S4. That is, the current value of the driving current S2 is detected by a Hall device 32, and a error between the current command signal S4 and a current detection signal S3 output from the Hall device 32 is obtained by a subtraction circuit 30. A power transistor 31 supplies the driving current S2 in accordance with the obtained error.

The actuator 2 supplied with the driving current S2 generates a driving force S1 to move the positioning mechanism 1.

A subsystem P surrounded by the chain line in FIG. 1, that is, a transfer function from the control input signal S6 to the position detection signal S8 is intended to be controlled in view of the processor 10.

Next, description will be made on the first-order low pass filter 4.

Figure 2:
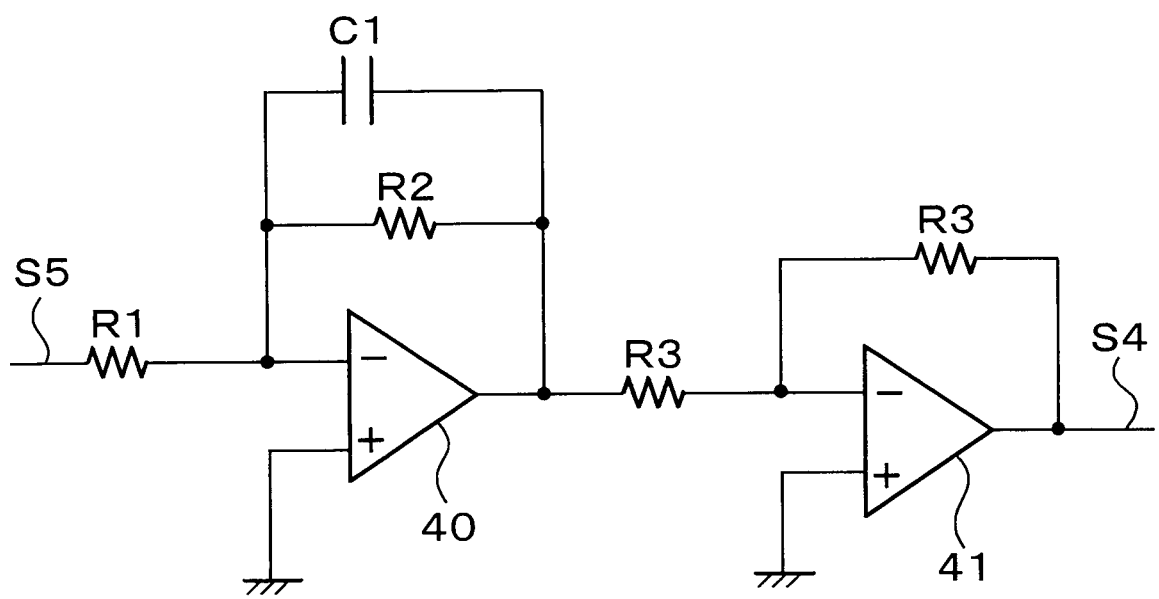
FIG. 2 is a circuit diagram of a first-order low pass filter according to the present invention.

FIG. 2 is a circuit diagram of the first-order low pass filter 4 in FIG. 1.

A first-order delay component is constituted by an operational amplifier 40, an input resistor R1 connected thereto, a feedback-side resistor R2 and a capacitor C1. Further, an inverting circuit of gain 1 is constituted by an operational amplifier 41 and resistors R3, and connected in series with the output of the operational amplifier 40 so as to invert the polarity of the signal. A transfer function from the signal S5 to the signal S4 in this circuit is a first-order low pass filter expressed by Expression 1. The cut-off frequency of this first-order low pass filter is expressed by Expression 2. Expression 2 is expressed in Hz.

$$G_{LP}(s) = \frac{\frac{1}{R_1 C_1}}{s + \frac{1}{R_2 C_1}} \quad (1)$$

$$\frac{1}{2\pi R_2 C_1} \quad (2)$$

As the cut-off frequency expressed by Expression 2 is made lower, the current command signal S4 becomes smoother, and at the same time, the phase delay increases, though. It is therefore necessary to provide a servo compensator for keeping a feedback loop of a servo control system stable. Next, the concept thereof will be described.

A controlled object P is formed as a model using a state equation. The servo compensator is designed based on the model.

Figure 3:
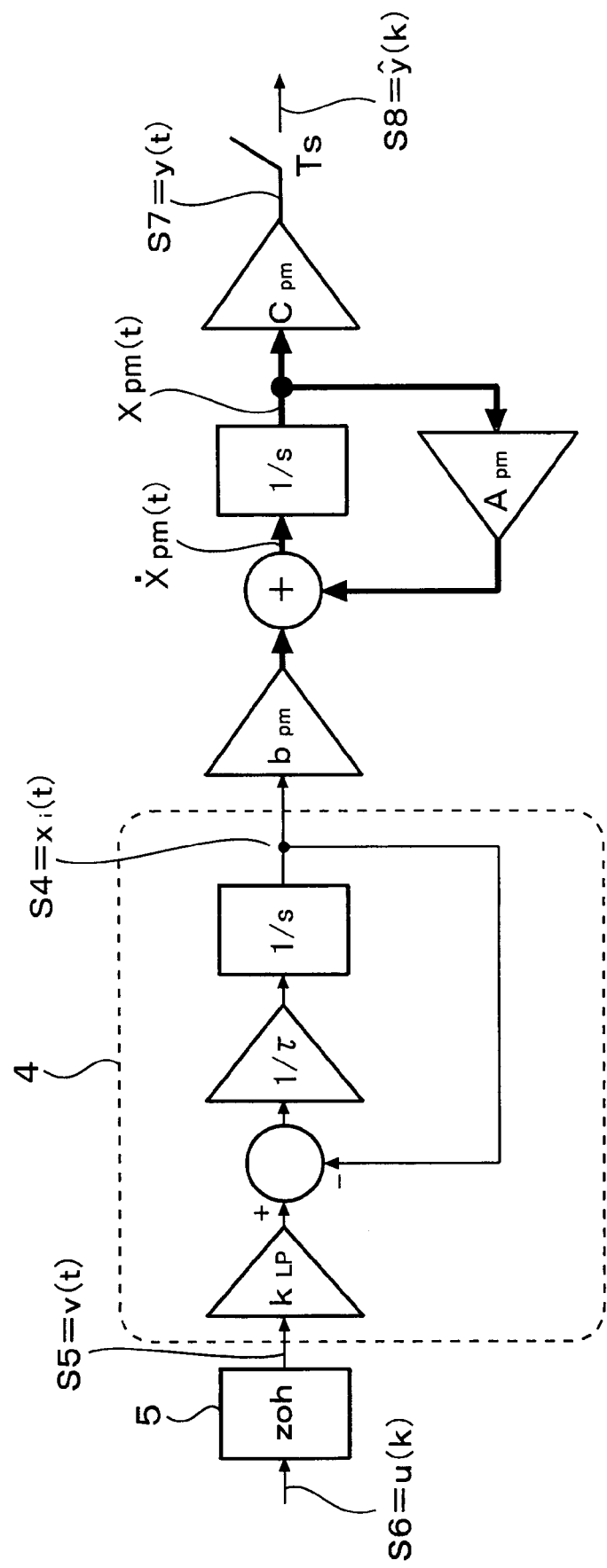
FIG. 3 is a block diagram of an controlled object according to the present invention.

FIG. 3 is a block diagram of the controlled object P from the control input signal S6 to the position detection signal S8.

In FIG. 3, the symbol s designates a complex variable of Laplace transform, and 1/s designates an integrator. The symbol Ts designates a sampler operating with a sampling period Ts, corresponding to the fact that the processor 10 reads the discrete-time position detection signal S8 from the encoder 6 for every sampling period. The symbol k (k=0, 1, 2, . . . ) designates a discrete time by sampling period. The symbol τ designates a time constant of the first-order low pass filter 4, and the symbol kLP designates a coefficient of the first-order low pass filter 4.

The D/A converter 5 is a zero-order holder (zoh) in view of sampled data control. By the D/A converter 5, the discrete-time control input signal S6 (S6=u(k)) is zero-order held and formed into the analog voltage signal S5 (S5=v(t)). The transfer function of the first-order low pass filter 4 is expressed by Expression 3. Since Expression 3 is equivalent to Expression 1, the relationship between the time constant τ and the circuit constants of FIG. 2 and the relationship between the coefficient kLP and the circuit constants of FIG. 2 are expressed by Expression 4 and Expression 5 respectively.

The first-order low pass filter 4 has one integrator. When one state variable corresponding thereto is designated by xi(t), the state equation of the first-order low pass filter 4 is expressed by Expression 6.

Further, when xpm(t) designates a state variable vector, Apm designates a square coefficient matrix, bpm designates an input coefficient vector, and cpm designates an output coefficient vector, the dynamic characteristic from the current command signal S4 to the displacement S7 of the positioning mechanism 1 is expressed by linear time-invariant state equations as shown in Expression 7 and Expression 8. Incidentally, the ruby symbol • in Expression 6 and Expression 7 designates first-order differential calculus related to time.

$$G_{LP}(s) = \frac{\frac{k_{LP}}{\tau}}{s + \frac{1}{\tau}} \quad (3)$$

$$\tau = R_2 C_1 \quad (4)$$

$$k_{LP} = \frac{R_2}{R_1} \quad (5)$$

$$\dot{x}_i(t) = \left[-\frac{1}{\tau}\right] x_i(t) + \left[\frac{k_{LP}}{\tau}\right] v(t) \quad (6)$$

$$\dot{x}_{pm}(t) = A_{pm} x_{pm}(t) + b_{pm} x_i(t) \quad (7)$$

$$y(t) = c_{pm} x_{pm}(t) + [0] x_i(t) \quad (8)$$

FIG. 4 shows again characteristic of a frequency-response transfer function of the controlled object P, which is a characteristic from the discrete-time control input signal S6 to the discrete-time position detection signal S8 in FIG. 3. The horizontal axis is a logarithmic axis of a frequency, which shows a characteristic not higher than ½ (Nyquist frequency fnyq) of the sampling frequency.

Figure 4:
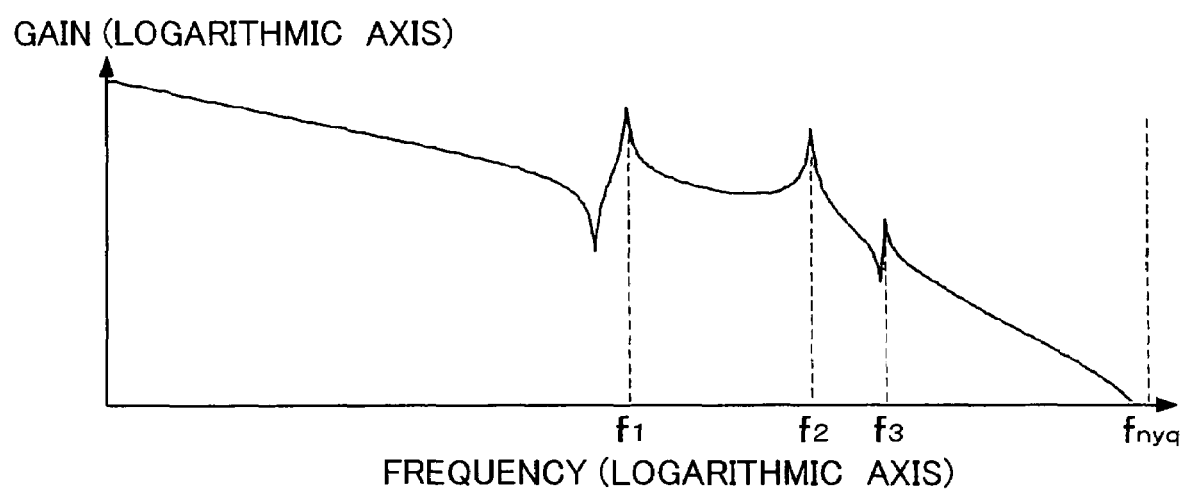
FIG. 4 is a graph showing a gain characteristic of a frequency-response transfer function of the controlled object according to the present invention.

From the gain characteristic of FIG. 4, it is understood that there are three resonant frequencies f1, f2 and f3, whereupon the positioning mechanism 1 has one rigid mode and three natural vibration modes. In the following description, these natural vibration modes will be referred to as first, second and third modes corresponding to the resonant frequencies f1, f2 and f3, respectively. The cut-off frequency of the first-order low pass filter 4 has to be made lower than the sampling frequency in order to eliminate stepwise signal components superimposed on the analog voltage signal S5. In this embodiment, the cut-off frequency is set to be 1/10 of the Nyquist frequency fnyq.

In order to design the servo compensator for the controlled object P having a characteristic as shown in FIG. 4, it is first necessary to produce a discrete-time state equation model of the controlled object P. To this end, Expression 6 is connected in series with Expression 7 and Expression 8 so as to obtain continuous-time state equations shown in Expression 9 and Expression 10 respectively. In consideration of the D/A converter 5, discrete-time conversion is performed upon Expression 9 and Expression 10 using a zero-order hold input so as to obtain Expression 11 and Expression 12 respectively.

$$\begin{bmatrix} \dot{x}_{pm}(t) \\ \dot{x}_i(t) \end{bmatrix} = \begin{bmatrix} A_{pm} & b_{pm} \\ 0 & -1/\tau \end{bmatrix} \begin{bmatrix} x_{pm}(t) \\ x_i(t) \end{bmatrix} + \begin{bmatrix} 0 \\ k_{LP}/\tau \end{bmatrix} v(t) \quad (9)$$

-continued $$y(t) = \begin{bmatrix} c_{pm} & 0 \end{bmatrix} \begin{bmatrix} x_{pm}(t) \\ x_i(t) \end{bmatrix} + [0]v(t) \quad (10)$$

$$x_p(k+1) = A_p x_p(k) + b_p u(k) \quad (11)$$

$$\hat{y}(k) = c_p x_p(k) + [0]u(k) \quad (12)$$

In Expressions 11 and 12, the symbol k designates a discrete time by sampling period as described above. The discrete-time state variable vector xp(k) is obtained by converting the continuous-time state variable vector, in which the state variable vector xpm(t) of Expression 7 and the state variable xi(t) of Expression 6 have been integrated, into discrete time. Further, the coefficient matrix Ap, the input coefficient vector bp and the output coefficient vector cp are determined uniquely by converting Expressions 9 and 10 into discrete time using the zero-order hold input.

A discrete-time state equation model of the controlled object P has been constructed as described above. Next, description will be made on the design of the servo compensator based on this model.

As described above, the controlled object P includes a plurality of factors in phase delay, such as the first-order low pass filter 4, the three resonance points, the zero-order hold characteristic, etc. It is therefore important to stabilize the feedback loop in the design of the servo compensator.

Therefore, the state variable of the controlled object P is estimated by a state observer, and the feedback loop is stabilized by state feedback of the estimated value of the state variable.

Figure 5:
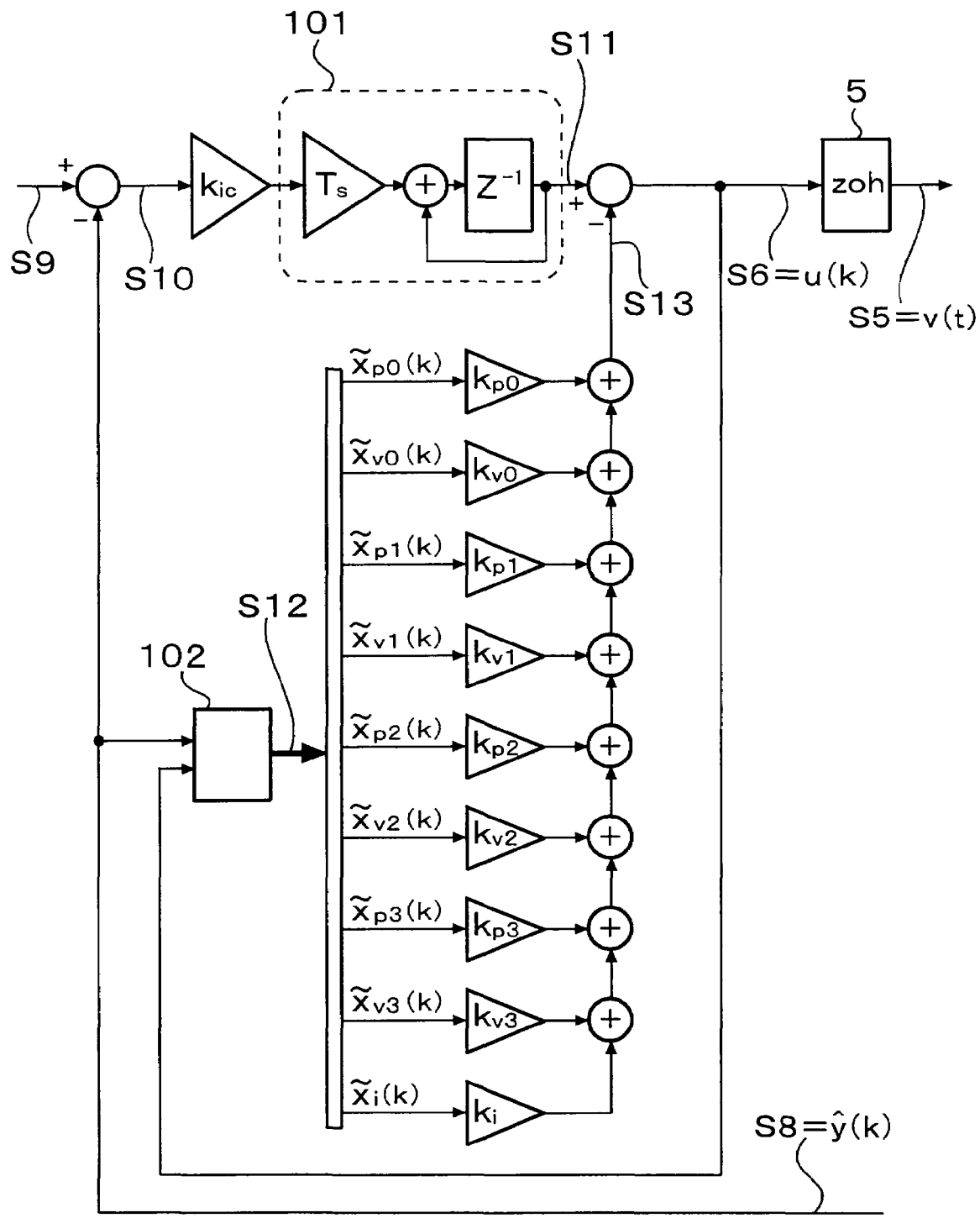
FIG. 5 is a block diagram of a digital servo compensator according to the present invention.

FIG. 5 is a block diagram of the digital servo compensator according to the present invention. In this embodiment, processing in FIG. 5 is performed internally in the processor 10.

A state observer 102 is a full-order observer based on the state equation model of Expressions 11 and 12. The state observer 102 receives the position detection signal S8 and the control input signal S6 as its inputs, and estimates a state vector S12. The state vector S12 is a vector having the following nine estimated state variables as its elements, that is, a displacement xp0(k) and a velocity xv0(k) in the rigid mode, a displacement xp1(k) and a velocity xv1(k) in the first natural vibration mode, a displacement xp2(k) and a velocity xv2(k) in the second natural vibration mode, a displacement xp3(k) and a velocity xv3(k) in the third natural vibration mode, and a state variable xi(k) of the first-order low pass filter 4.

The estimated state variables are multiplied by state feedback coefficients kp0, kv0, kp1, kv1, kp2, kv2, kp3, kv3 and ki respectively, and summed up. The sum of the products is set as a signal S13.

The essential function of the servo compensator is to make the position detection signal S8 follow the target position signal S9. The target position signal S9 is a step input. In order to eliminate the steady-state error of the position error signal S10, an integrating compensator 101 for making the servo compensator serve as a type-1 servo system is used. The symbol z in the integrating compensator 101 designates a complex variable of z-transform.

An output signal S11 of the integrating compensator 101 is added to the signal S13 so as to form the control input signal S6. Parameters to adjust the characteristic of the servo compensator are an integrating compensator gain kic and the aforementioned nine state feedback coefficients. These coefficient values are determined by parameter optimization of an optimal regulator.

Next, the effect obtained by carrying out the present invention will be described specifically as compared with that in a background-art servo control unit.

Figure 10:
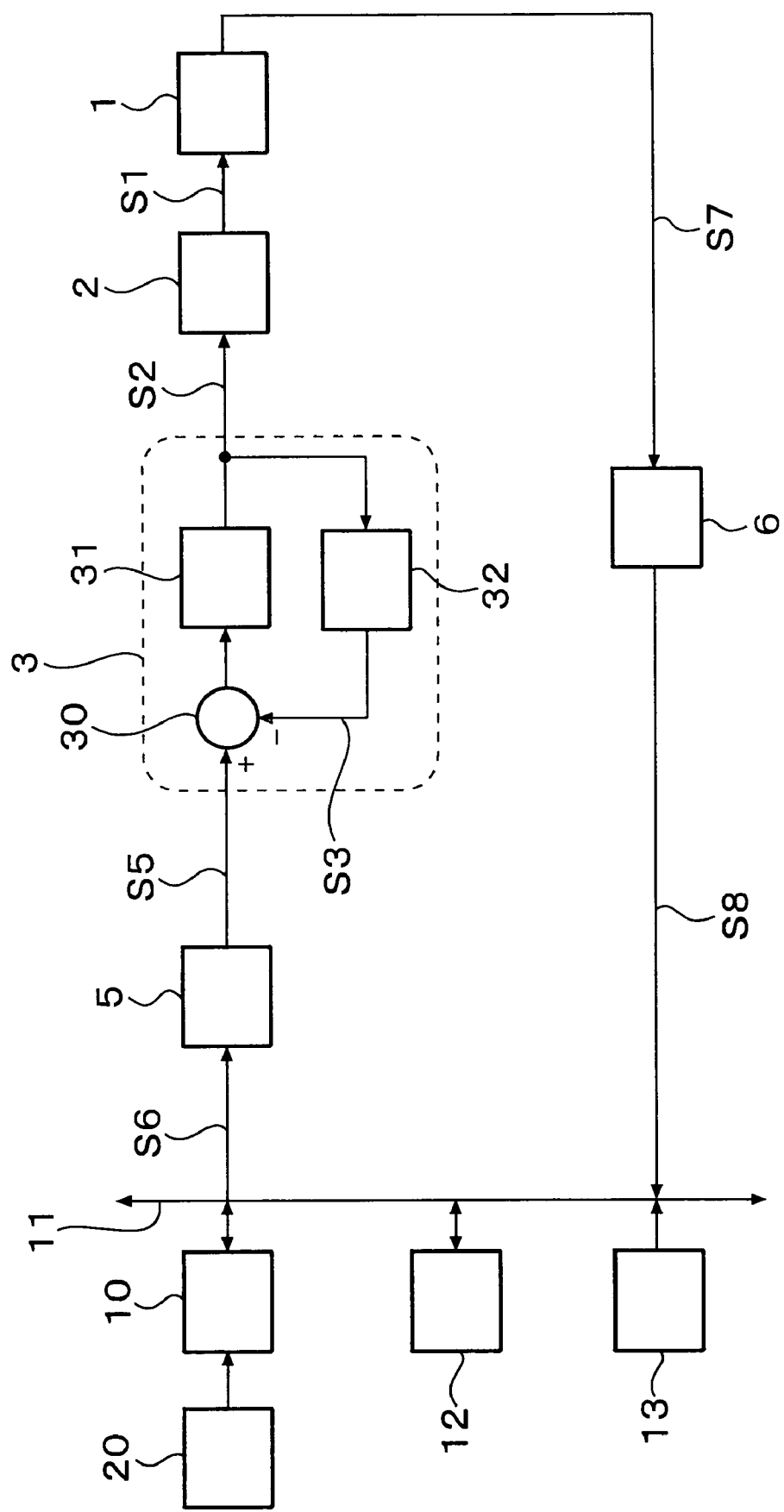
FIG. 10 is a block diagram of a background-art digital servo control unit.

The background-art servo control unit has a configuration shown in the block diagram of FIG. 10. The servo control unit according to the background art is different from that according to the present invention in that there is no filter for smoothing the output signal S5 of the D/A converter 5 but the output signal S5 is input directly to the current control circuit 3, and that in the servo control program, the state variable of the filter is not estimated or arithmetic processing of the state feedback is not performed.

The control unit according to the present invention and the control unit according to the background art will be compared below while the specifications about the positioning time and the setting accuracy are unified between them.

Figure 6A:
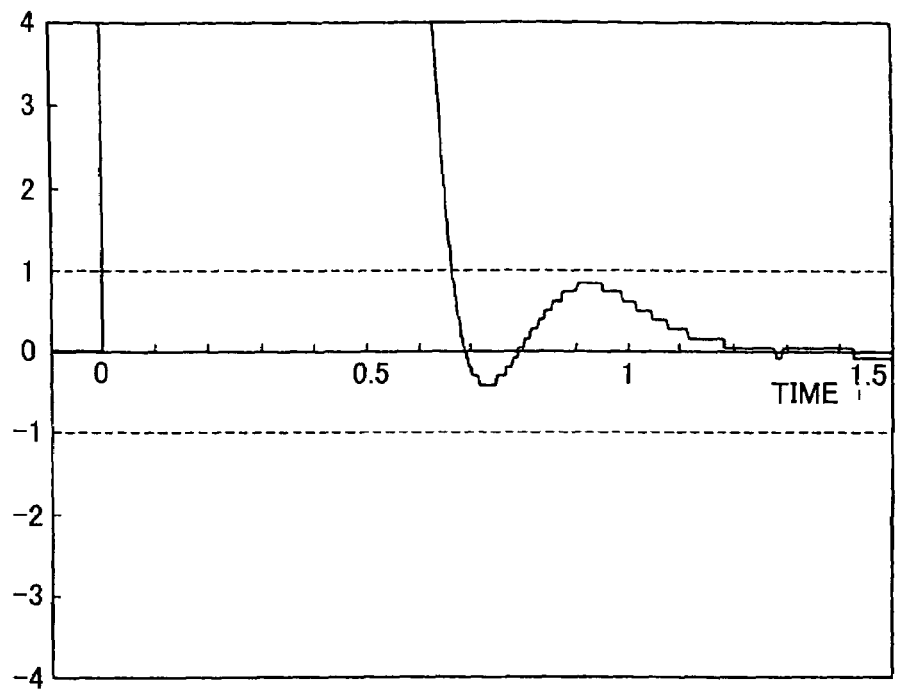
FIGS. 6A and 6B are graphs for explaining the present invention and the background art in comparison with each other.
Figure 6B:
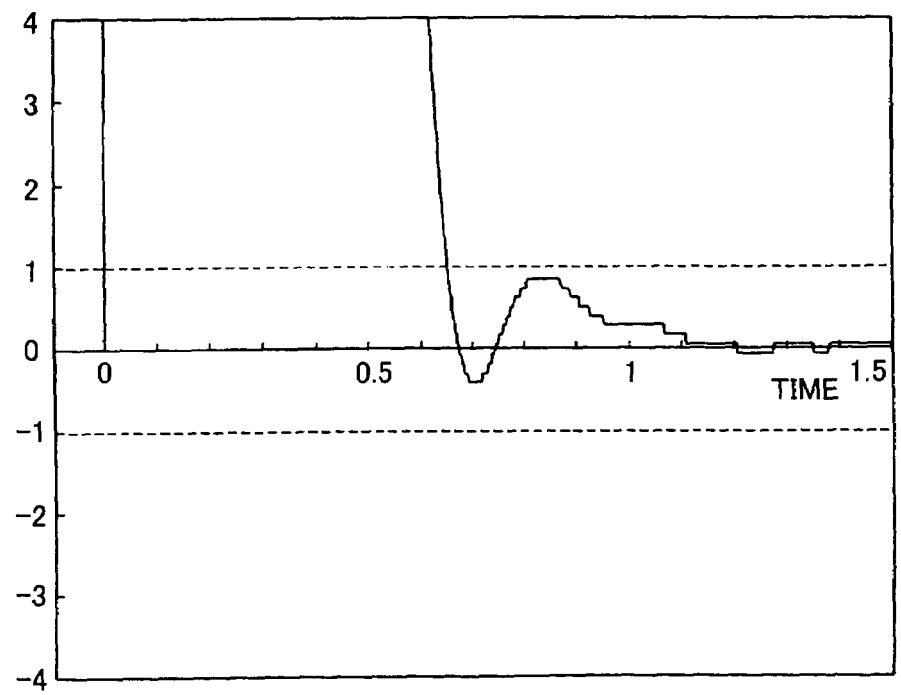
Figure 7A:
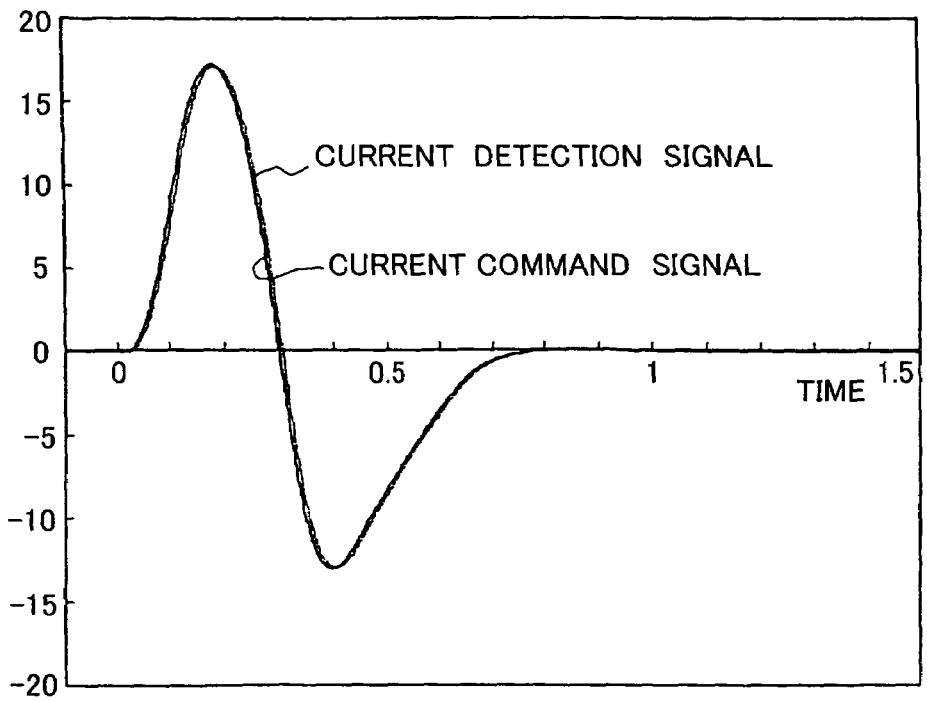
FIGS. 7A and 7B are graphs for explaining the present invention and the background art in comparison with each other.
Figure 7B:
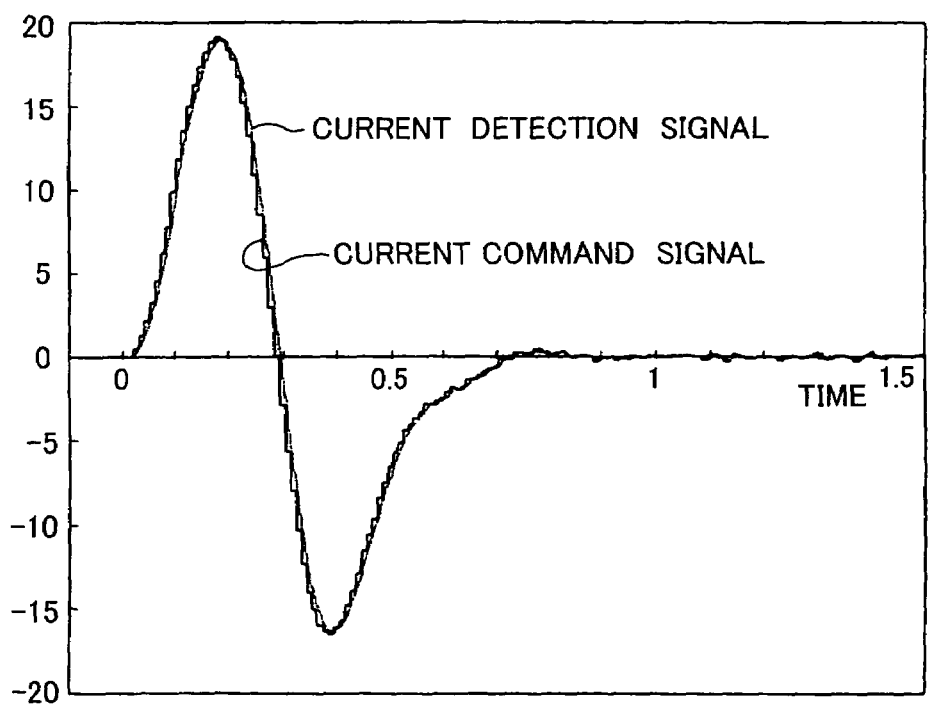
Figure 8A:
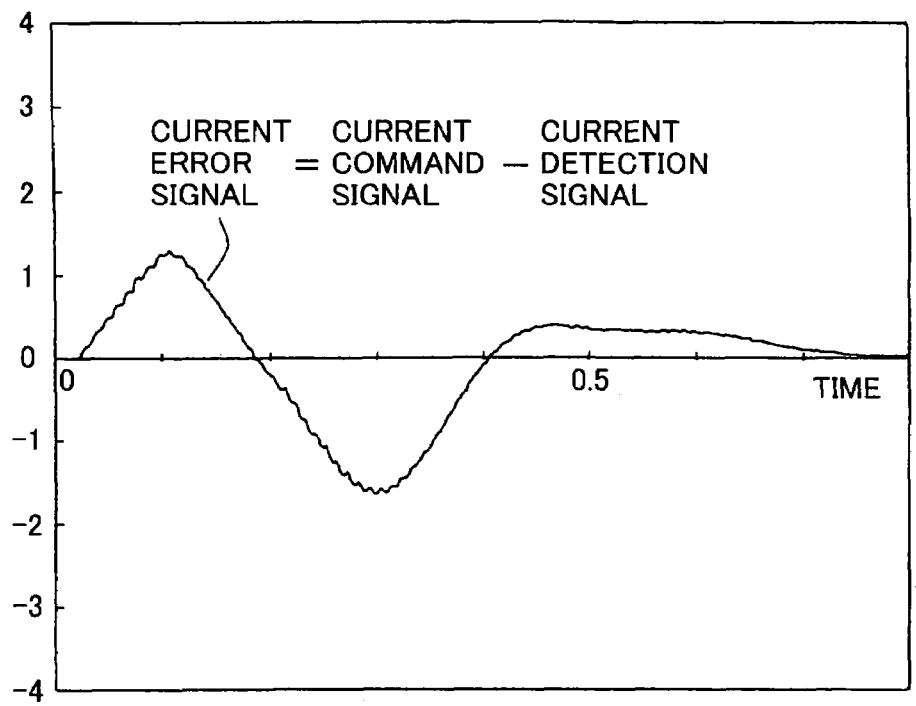
FIGS. 8A and 8B are graphs for explaining the present invention and the background art in comparison with each other.
Figure 8B:
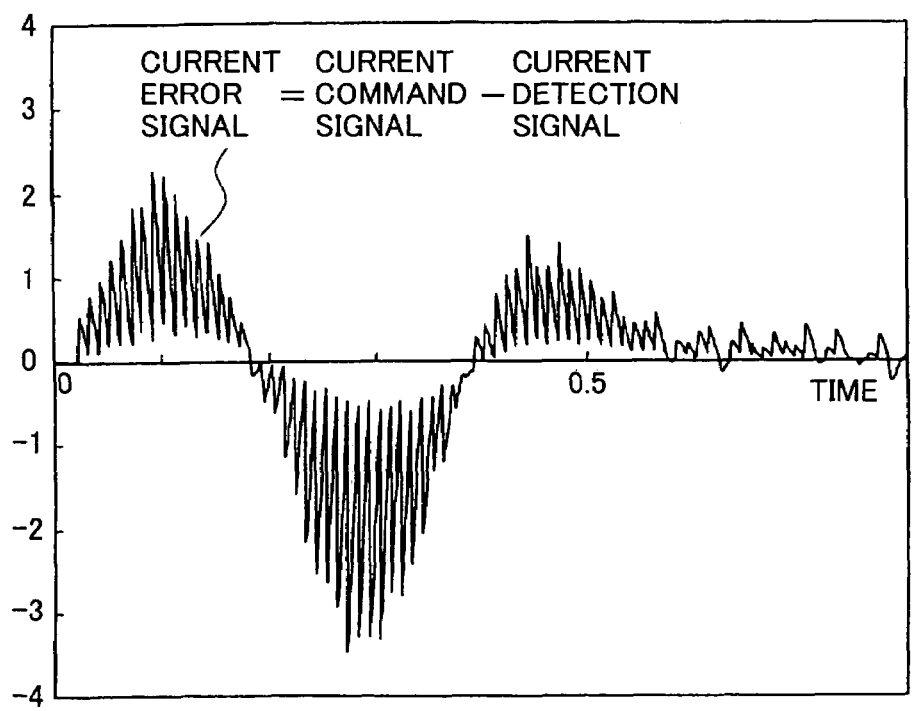
Figure 9A:
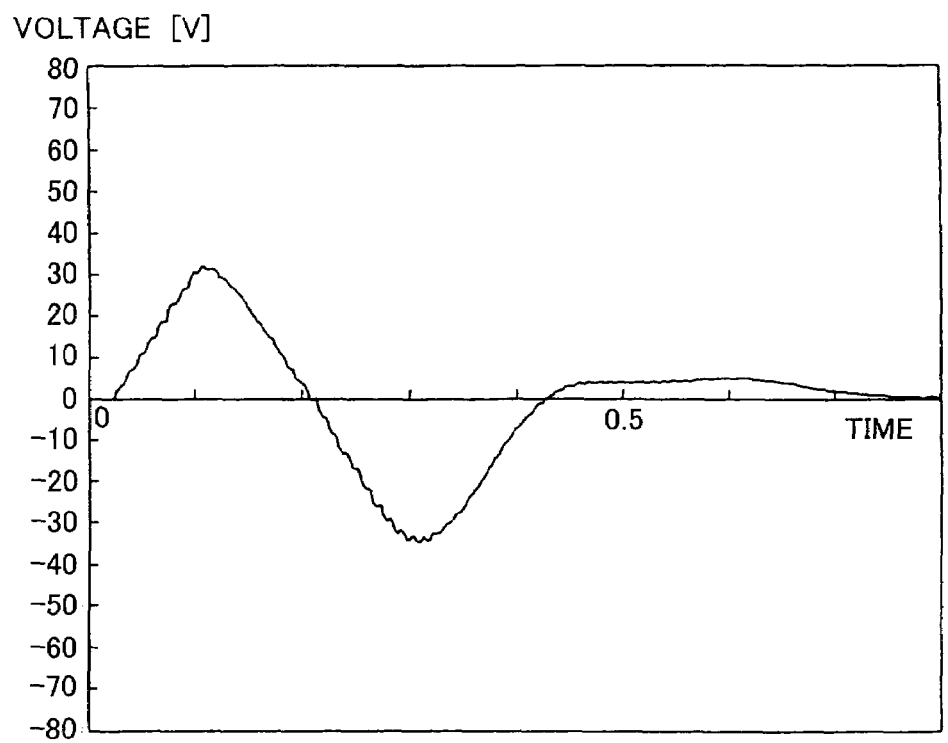
FIGS. 9A and 9B are graphs for explaining the present invention and the background art in comparison with each other.
Figure 9B:
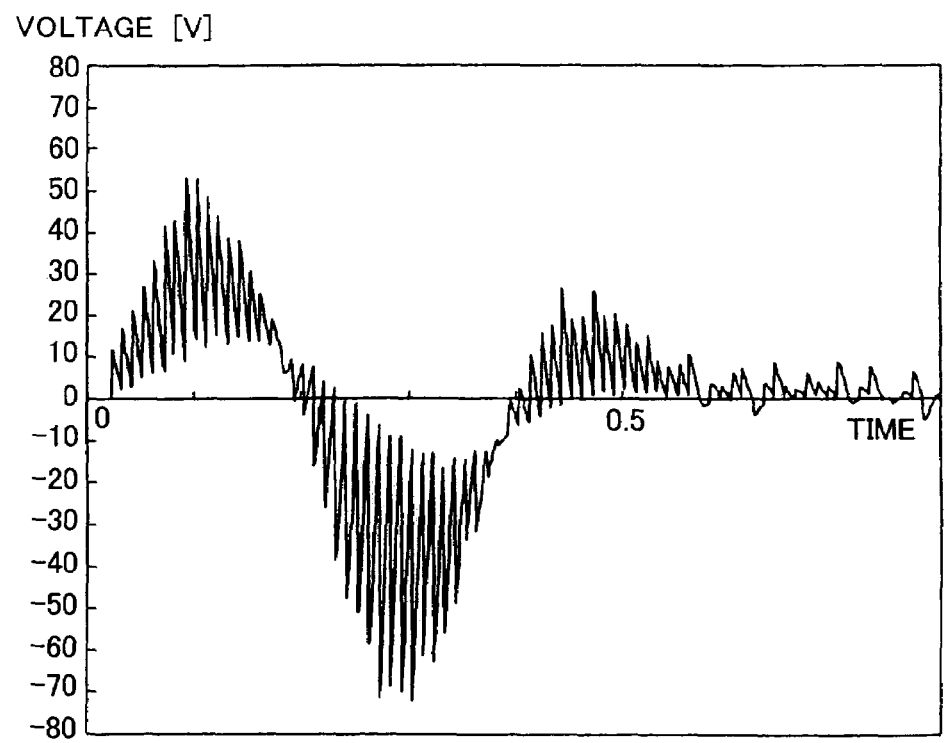

FIG. 6A, 6B shows time waveform of a positioning error in each control unit. FIG. 7A, 7B shows time waveforms of a current command signal and a current detection signal in each control unit. FIG. 8A, 8B shows a time waveform of a current error signal in each control unit. FIG. 9A, 9B shows a time waveform of a voltage applied to an actuator in each control unit. FIGS. 6A-9A show the case of the control unit according to the present invention, and FIGS. 6B-9B show the case of the control unit according to the background art.

As shown in FIGS. 6A and 6B, both the control units receiving step inputs with one and the same moving distance stabilize the inputs within an allowable range (±1) of the positioning error at time 0.66.

The current command signal in the case of the background art has a stepwise waveform whose value varies by sampling period as shown in FIG. 7B, while the current command signal in the case of the present invention is smoothed by the first-order low pass filter 4 as shown in FIG. 7A.

The current error signals in both the control units will be compared with each other. As shown in FIG. 8B, spike-like pulsation is greatly superimposed on the current error signal in the background-art unit, and the period of one spike is equal to the sampling period. This pulsation is generated by the difference between the stepwise current command signal and the smooth current detection signal as shown in FIG. 7B.

On the other hand, according to the present invention, the pulsation is substantially perfectly suppressed so that the peak value of the current error decreases to about ½ as shown in FIG. 8A.

As a result, the peak value of the voltage applied to the actuator reaches 73 V in the background-art unit as shown in FIG. 9B.

On the other hand, the peak value is suppressed to be 35 V according to the present invention, as shown in FIG. 9A. According to the present invention, a servo control unit having performance equal to that of the background-art servo control unit can be obtained even if the power supply voltage of the power transistor is reduced on a large scale.

SECOND EMBODIMENT

Although the current command signal S4 is smoothed by the first-order low pass filter 4 in the aforementioned first embodiment, this may be replaced by a second-order low pass filter. Here, when ωLP2 designates a cut-off frequency, ζLP2 designates a damping ratio and kLP2 designates a coefficient deciding a DC gain, a transfer function in the case of a second-order low pass filter is expressed by Expression 13.

$$G_{LP2}(s) = \frac{k_{LP2}}{s^2 + 2\zeta_{LP2}\omega_{LP2}s + \omega_{LP2}^2} \quad (13)$$

Though not shown, this second-order low pass filter can be also constituted by a simple operational amplifier circuit. In the same manner as in the first embodiment, the cut-off frequency is set to be lower than the sampling frequency. The configuration of the servo compensator is similar to that of FIG. 5, but the second-order low pass filter has two state variables. Therefore, the state observer 102 estimates the two state variables, and the estimated state variables are multiplied by state feedback coefficients and summed up.

THIRD EMBODIMENT

Although the current command signal S4 is smoothed by the low pass filter in the aforementioned first and second embodiments, this may be replaced by a notch filter. Here, when ωN designates a cut-off frequency, ζNd designates a damping ratio of a denominator, and ζNn designates a damping ratio of a numerator, a transfer function in the case of a notch filter is expressed by Expression 14.

$$G_N(s) = \frac{s^2 + 2\zeta_{Nn}\omega_N s + \omega_N^2}{s^2 + 2\zeta_{Nd}\omega_N s + \omega_N^2} \quad (14)$$

Though not shown, this notch filter can be also constituted by a simple operational amplifier circuit. In this event, it is intended to suppress spike-like pulsation as shown in FIG. 8B. It is therefore rational to make the cut-off frequency equal to the sampling frequency or an integer multiple of the Nyquist frequency. In order to remove harmonic components of the pulsation, a plurality of notch filters having different cut-off frequencies may be connected in series. Alternatively, a notch filter and a low pass filter may be used together. The configuration of the servo compensator is similar to that of FIG. 5. It is, however, necessary that the state variable values of the notch filter or the low pass filter are estimated by the state observer 102, and the estimated state variables are multiplied by state feedback coefficients and summed up.

As has been described above, when the present invention is applied to a digital servo control unit for a steerable mirror, it is possible to use a low-voltage and low-price power supply as a power supply for operating the power transistor 31. The filter 4 for smoothing the current command signal S4 is a simple operational amplifier circuit. The stabilizing compensation means for compensating a phase delay caused by the filter 4 can be implemented by estimating the state variable values of the filter 4 by means of the state observer 102 of the servo control program and adding calculation of summing products for state feedback about the estimated values. By such a low-price electric circuit and a simple change of the servo control program, the angle of the steerable mirror can be positioned and controlled with performance and specification equivalent to those in the background art.

In a laser machining apparatus having a digital servo control unit, an actuator driven by the digital servo control unit, and a steerable mirror positioned by the actuator, the angle of a laser beam reflected by the steerable mirror is controlled to machine a predetermined position of a product to be machined. When the steerable mirror is servo-controlled by the digital servo control unit according to the present invention, the cost of parts of the laser machining apparatus can be reduced while the machining throughput and the performance as to the perforating position accuracy are kept.

The present invention is not limited to the servo control unit for a steerable mirror. The present invention can be applied broadly to digital servo control units where control input signals are D/A-converted.

What is claimed is:

1. A digital servo control unit comprising:
a processor for performing a servo control process for every predetermined sampling period;
a D/A converter for converting a control input signal into an analog signal, the control input signal being calculated by the servo control process;
a current control circuit for controlling a driving current to be supplied to an actuator in accordance with the D/A-converted control input signal;
a filter acting on the analog signal output by the D/A converter; and
a stabilizing compensation means for compensating a phase delay caused by the filter;
wherein an output signal of the filter is input to the current control circuit as a current command signal, and
wherein the filter is a low pass filter having a cut-off frequency which is lower than a sampling frequency.

2. A digital servo control unit comprising:
a processor for performing a servo control process for every predetermined sampling period;
a D/A converter for converting a control input signal into an analog signal, the control input signal being calculated by the servo control process;
a current control circuit for controlling a driving current to be supplied to an actuator in accordance with the D/A-converted control input signal;
a filter acting on the analog signal output by the D/A converter; and
a stabilizing compensation means for compensating a phase delay caused by the filter;
wherein an output signal of the filter is input to the current control circuit as a current command signal, and
wherein the filter is a notch filter having a cut-off frequency which is equal to a sampling frequency.

3. A digital servo control unit comprising:
a processor for performing a servo control process for every predetermined sampling period;
a D/A converter for converting a control input signal into an analog signal, the control input signal being calculated by the servo control process;
a current control circuit for controlling a driving current to be supplied to an actuator in accordance with the D/A-converted control input signal;
a filter acting on the analog signal output by the D/A converter; and
a stabilizing compensation means for compensating a phase delay caused by the filter;
wherein an output signal of the filter is input to the current control circuit as a current command signal, and
wherein the filter is a notch filter having a cut-off frequency which is equal to an integral multiple of a Nyquist frequency.

4. A laser machining apparatus comprising:
a digital servo control unit comprising a processor for performing a servo control process for every predetermined sampling period; a D/A converter for converting a control input signal into an analog signal, the control input signal being calculated by the servo control process; a current control circuit for controlling a driving current to be supplied to an actuator in accordance with the D/A-converted control input signal; a filter acting on the analog signal output by the D/A converter; and a stabilizing compensation means for compensating a phase delay caused by the filter; wherein an output signal of the filter is input to the current control circuit as a current command signal;

an actuator to be driven by the digital servo control unit; and a steerable mirror to be positioned by the actuator;

wherein an angle of a laser beam reflected by the steerable mirror is controlled to machine a predetermined position of a to-be-machined product, and wherein the filter is a low pass filter having a cut-off frequency which is lower than a sampling frequency.

5. A laser machining apparatus comprising:

a digital servo control unit comprising a processor for performing a servo control process for every predetermined sampling period; a D/A converter for converting a control input signal into an analog signal, the control input signal being calculated by the servo control process; a current control circuit for controlling a driving current to be supplied to an actuator in accordance with the D/A-converted control input signal; a filter acting on the analog signal output by the D/A converter; and a stabilizing compensation means for compensating a phase delay caused by the filter; wherein an output signal of the filter is input to the current control circuit as a current command signal;

an actuator to be driven by the digital servo control unit; and a steerable mirror to be positioned by the actuator;

wherein an angle of a laser beam reflected by the steerable mirror is controlled to machine a predetermined position of a to-be-machined product, and wherein the filter is a notch filter having a cut-off frequency which is equal to a sampling frequency.

6. A laser machining apparatus comprising:

a digital servo control unit comprising a processor for performing a servo control process for every predetermined sampling period; a D/A converter for converting a control input signal into an analog signal, the control input signal being calculated by the servo control process; a current control circuit for controlling a driving current to be supplied to an actuator in accordance with the D/A-converted control input signal; a filter acting on the analog signal output by the D/A converter; and a stabilizing compensation means for compensating a phase delay caused by the filter; wherein an output signal of the filter is input to the current control circuit as a current command signal;

an actuator to be driven by the digital servo control unit; and a steerable mirror to be positioned by the actuator;

wherein an angle of a laser beam reflected by the steerable mirror is controlled to machine a predetermined position of a to-be-machined product, and wherein the filter is a notch filter having a cut-off frequency which is equal to an integral multiple of a Nyquist frequency.

* * * * *